United States Patent
Simpson

(10) Patent No.: US 6,244,981 B1
(45) Date of Patent: Jun. 12, 2001

(54) HYDRAULIC TENSIONER WITH PAWL-STYLE EXTERNAL RACK

(75) Inventor: Roger T. Simpson, Ithaca, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/379,489

(22) Filed: Aug. 23, 1999

Related U.S. Application Data

(60) Provisional application No. 60/101,724, filed on Sep. 21, 1998.

(51) Int. Cl.[7] ........................................ F16H 7/08
(52) U.S. Cl. .................................. 474/110; 474/138
(58) Field of Search ........................ 474/109–111, 112, 474/117, 135, 140, 138, 113, 101

(56) References Cited

U.S. PATENT DOCUMENTS

| | | |
|---|---|---|
| 3,802,286 | 4/1974 | Winklhofer et al. . |
| 3,812,733 | 5/1974 | Yoshida . |
| 4,713,043 | 12/1987 | Biederman . |
| 4,792,322 | 12/1988 | Goppelt . |
| 4,822,320 | 4/1989 | Suzuki . |
| 4,874,352 | 10/1989 | Suzuki . |
| 5,004,448 | 4/1991 | Ojima . |
| 5,030,169 * | 7/1991 | Kiso et al. ........................... 474/110 |
| 5,073,150 | 12/1991 | Shimaya . |
| 5,184,982 | 2/1993 | Shimaya et al. . |
| 5,259,820 | 11/1993 | Mott . |
| 5,304,099 | 4/1994 | Depp et al. . |
| 5,366,415 * | 11/1994 | Church et al. ........................ 474/110 |
| 5,649,878 | 7/1997 | Noguchi . |
| 5,653,653 | 8/1997 | Ledvina . |
| 5,700,214 | 12/1997 | Kuznets et al. . |
| 5,700,215 | 12/1997 | Tada et al. . |
| 5,860,881 | 1/1999 | Tada . |
| 5,908,363 | 6/1999 | Suzuki . |
| 5,951,423 * | 9/1999 | Simpson ........................ 474/111 X |
| 5,967,921 | 10/1999 | Simpson et al. . |
| 5,989,139 | 11/1999 | Dusinberre et al. . |

FOREIGN PATENT DOCUMENTS

| | | |
|---|---|---|
| 3232322 * | 3/1984 | (DE) . |
| 0 106 325 | 4/1984 | (EP) ............................. F16H/7/08 |
| 2233062 | 1/1991 | (GB) . |
| 6-174019 * | 6/1994 | (JP) . |

* cited by examiner

Primary Examiner—David A. Bucci
Assistant Examiner—Marcus Charles
(74) Attorney, Agent, or Firm—Fitch, Even, Tabin & Flannery; Greg Dziegielewski

(57) ABSTRACT

A hydraulic tensioner having a pawl-style rack member. The rack member is located in a groove in a bore in the tensioner housing. The tensioner piston has grooves along its exterior surface that correspond to the wedges or grooves in the pawl rack member and prevent the piston from being pushed inward. The pawl rack member may be a pair of pawls located in the tensioner bore. A flexible tab on the upper portion of the rack member contacts a groove on the upper portion of the piston to retain the piston in place for shipping.

17 Claims, 4 Drawing Sheets

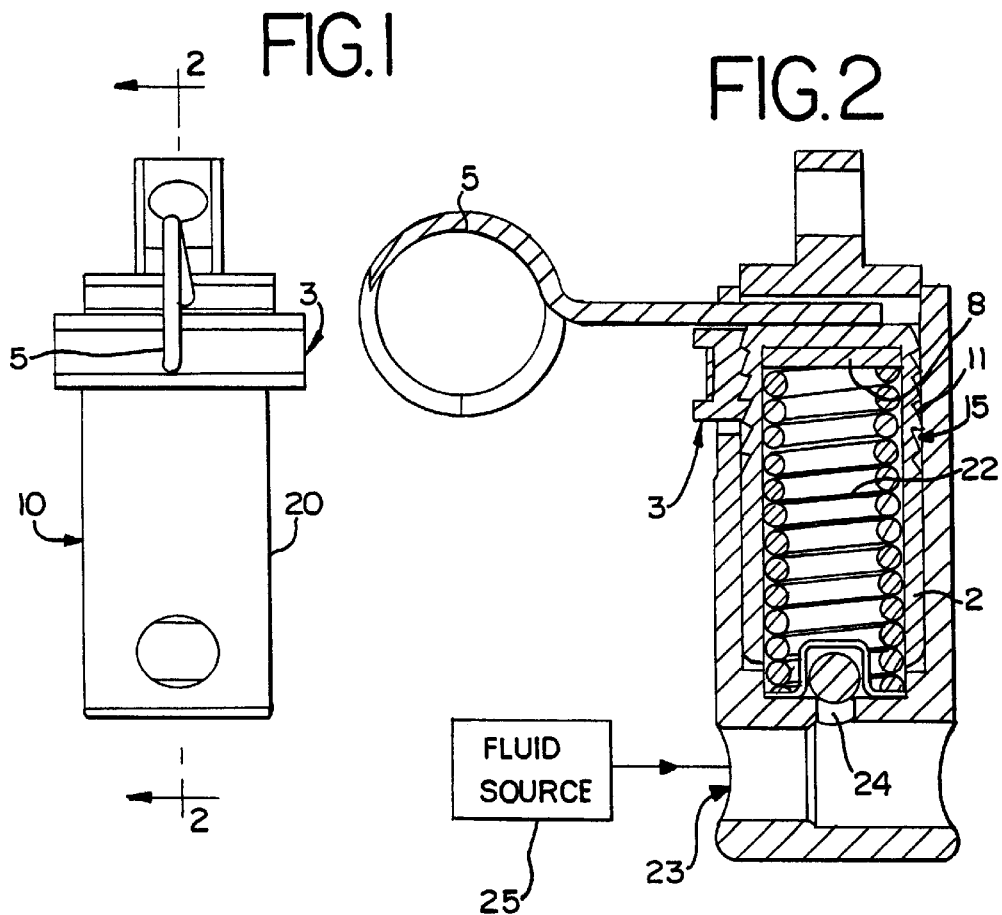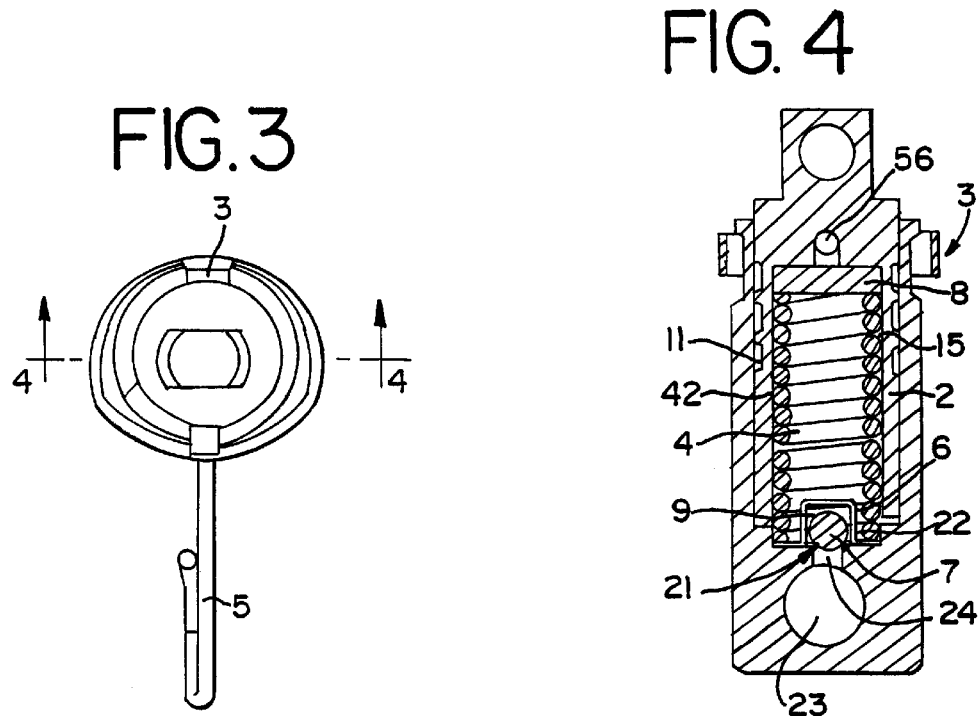

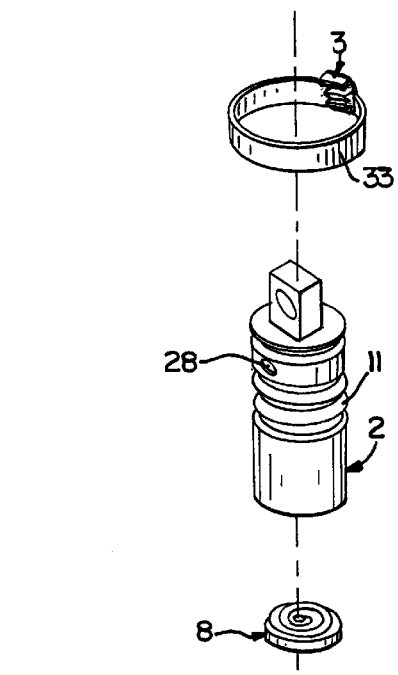
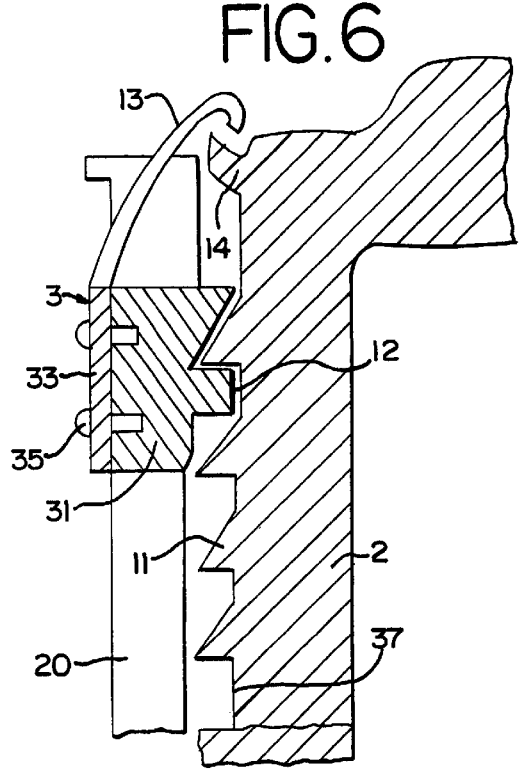
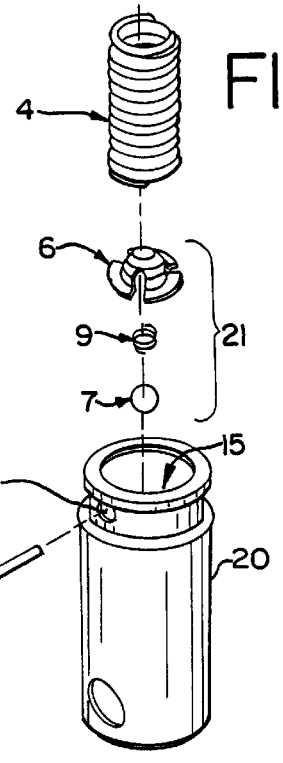
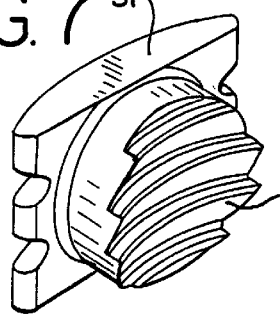
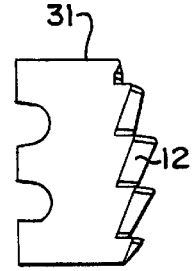
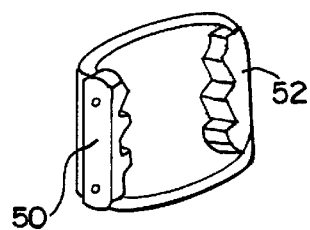

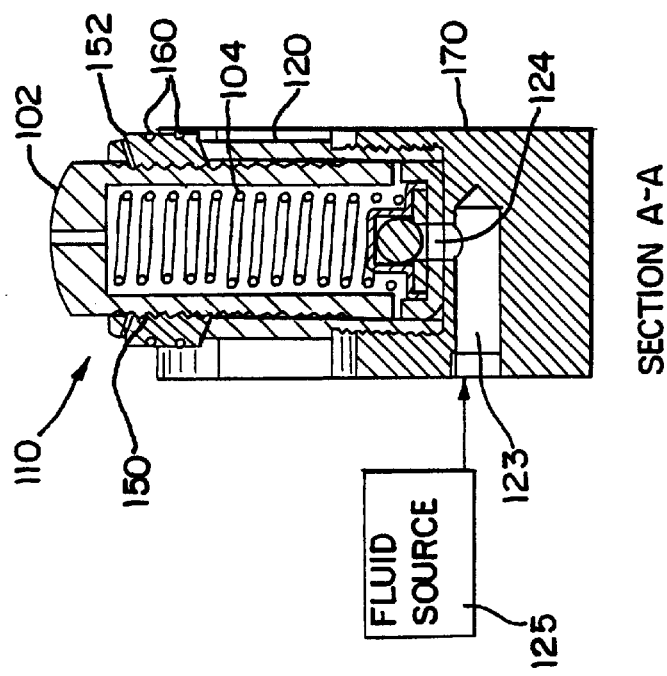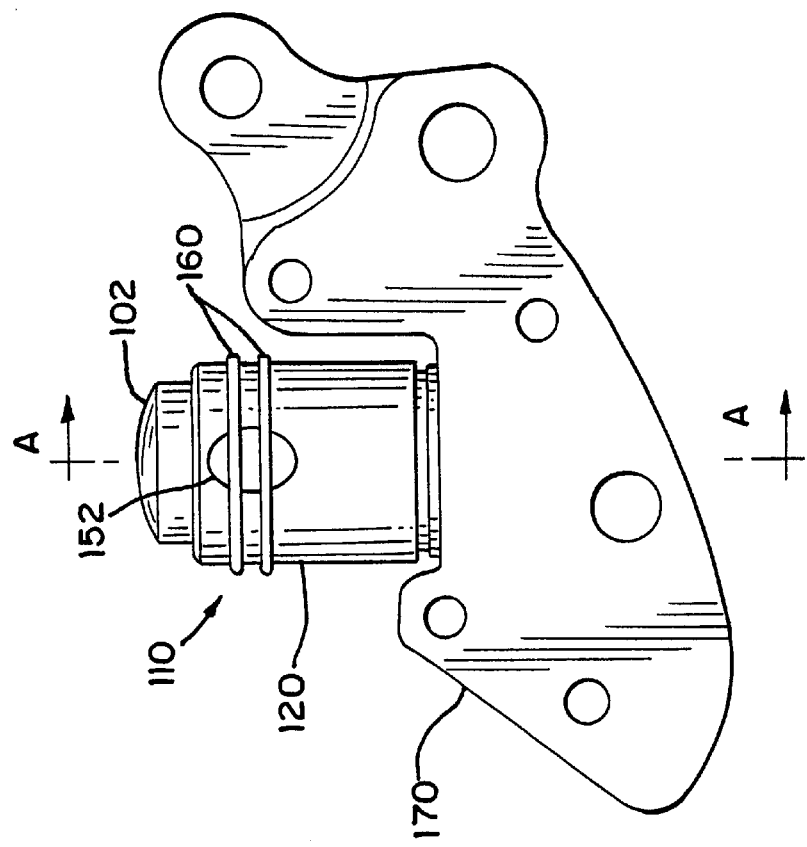

HYDRAULIC TENSIONER WITH PAWL-STYLE EXTERNAL RACK

This application claims benefit of provisional application U.S. Ser. No. 60/101,724, filed Sep. 21, 1998. Reference is made to co-pending U.S. application Ser. No. 08/852,925, filed May 8, 1997, entitled "Hydraulic Tensioner With External Rack," the subject matter of which relates to the present invention and is incorporated herein by reference.

BACKGROUND OF THE INVENTION

The present invention relates to a hydraulic chain tensioner having an external rack. More particularly, the hydraulic tensioner of the present invention has a pawl-style external rack on the outside of the piston to limit piston travel and limit backlash.

Hydraulic tensioners are typically used as a control device for a chain drive in an automobile engine timing system. The tension in the chain can vary greatly due to the wide variation in the temperature and the linear expansion among the various parts of the engine. Moreover, wear to the chain components during prolonged use can produce a decrease in the tension of the chain. A hydraulic tensioner is used to take up the slack in the chain or belt that connects the camshafts to the crankshaft of the engine timing system. The tensioner piston must be able to extend outward as the chain stretches from higher engine speed and withdraw back inward when the chain loads have decreased with lower engine speeds. The piston travel from idle to maximum engine speed for most overhead cam engines ranges from 1 to 4 mm.

A typical hydraulic tensioner is comprised of a housing having a bore, a piston biased in a protruding direction from the bore by a spring, and a fluid chamber defined by the hollow piston and bore. A check valve is also included in the hydraulic tensioner to permit fluid flow from a source of pressurized fluid into a reservoir or oil supply passage into the fluid chamber, while preventing back flow in the reverse direction. The force of the chain against the piston in an inward direction is balanced by the resistance force of the fluid and the force of the spring in an outward direction.

A typical hydraulic tensioner usually has a no-return function, where the piston moves easily in one direction, but with more difficulty in the reverse direction. When the engine is started, the oil supply pressure to the tensioner is delayed by several seconds. During this time, the tensioner may not have enough oil to fill the fluid chamber. As a result, the piston could be pushed to the bottom of the tensioner bore from the chain motion. A proper load would not be maintained on the chain and noise could be generated. In addition, the lower piston position might even allow the chain to jump a tooth on either the crank or cam sprockets.

One example of a tensioner having a no-return function is shown in Winklhofer et al., U.S. Pat. No. 3,802,286. The piston of the Winklhofer et al. tensioner has a spiral rack on the inside wall of the bore to limit back travel and prevent the piston from retracting.

Another example of a tensioner having a no-return function, Yoshida, U.S. Pat. No. 3,812,733, has a ratchet system with grooves on the outside of a piston and a detent with a spring to prevent the piston from advancing and retracting. Similarly, in U.S. Pat. No. 4,713,043, Biedermann includes grooves on the outside of the piston with a spring-loaded catch.

The rack or no-return system must also permit some backlash or limited backward piston movement. In U.S. Pat. No. 4,792,322, Goppelt addresses the problem of insufficient backlash by including an internal ring and groove system. An additional ring and groove are also used to hold the piston in place during shipping. This system is expensive because the grooves must be on the inside of the tensioner bore as well as on the outside of the piston.

Suzuki, U.S. Pat. No. 4,822,320 also provides an anti-backlash rack with grooves broached into the outside of the piston. A ratchet is pivotally connected to a housing to allow positive backlash. Suzuki also provides this ratchet system in U.S. Pat. No. 4,874,352, where the ratchet is supported by a spring, and in U.S. Pat. No. 5,006,095, where the number of teeth on the ratchet is n times that of the teeth on the rack. In addition, Shimaya, U.S. Pat. No. 5,073,150, incorporates the ratchet mechanism of Suzuki with a different tensioner.

Another example of a ratchet mechanism is disclosed in Deppe et al., U.S. Pat. No. 5,304,099. The ratchet mechanism of Deppe et al. includes grooves on the outside of a piston and a ratchet plunger biased by a spring. The ratchet is disengaged during normal operations and engaged during shut down to maintain the tensioner in an operative position.

An example of a mechanism that limits the travel of a shaft device is disclosed in Ojima, U.S. Pat. No. 5,004,448. A coil portion contacts a tension rod. The coil acts as a friction brake by causing an enlargement to prevent advancement of the rod or a shrinkage of the diameter of the coil portion to release the rod from the tensioner.

Mott, U.S. Pat. No. 5,259,820, provides an internal ratchet system positioned within the mounting cavity and constructed from a cylinder having two helical openings. The piston engages with the helical openings when the piston experiences sufficient force to be pushed inward. As a result, this tensioner provides tension to the chain when the fluid pressure to the tensioner is low.

Similarly, in the present invention, an external rack is provided along the outside of the piston to provide tension during low pressure. The piston is still permitted to move back several millimeters more than the average piston when the engine is running. The pawl slides back and forth in a series of slots or grooves formed along the exterior surface of the piston, while a spring band biases the pawl against the piston.

SUMMARY OF THE INVENTION

The present invention is directed to a hydraulic chain tensioner having an external rack. The tensioner includes a housing with a central bore. A hollow piston is slidably received within the bore and creates a fluid chamber with the bore. The piston, or plunger, is biased in a protruding direction from the housing by a spring.

A passage is provided in the housing to connect the chamber with a source of pressurized fluid. A check valve is provided between the chamber and the source of pressurized fluid to permit fluid flow into the chamber, while blocking flow in the reverse direction. The check valve may be a ball and spring check valve, a spring valve, or a variable orifice check valve, as presently known in the tensioner art.

The tensioner also includes a rack and ratchet assembly that has several features. First, the assembly provides a mechanical no-return function, or anti backlash feature. An external rack is formed with pawl style wedges that fit within a series of corresponding wedge-shaped grooves in a rack formed on the outside of the piston. The pawl wedges slide back and forth within the corresponding grooves formed on the piston. A spring-steel band around outside of the pawl biases the pawl wedges toward the grooves formed on the outside or exterior surface of the piston.

The piston retention feature of the rack and ratchet system limits the outward travel of the piston. After the wedges on the pawl rack pass the last rack member, or groove, on the piston, the wedges are biased toward the piston and catch in final stepped groove of the piston. As a result, no further outward movement of the piston is permitted.

In another embodiment of the present invention, the hydraulic tensioner has a pair of pawls. The two pawls are located opposite each other in grooves in the tensioner bore and held in place by a set of circlips. One of the two pawls is located higher than the other in the tensioner body. As the piston extends it engages first one pawl and then the other. By off setting the openings in the tensioner body in which the pawls are inserted, the pitch of the grooves or steps on the piston and the pitch on the pawls may be made larger for ease of manufacturing.

Another feature of the present invention is the flexible tabs that serve as shipping retention tabs to hold the piston in the innermost position for shipping and automatically release when the tensioner is installed in an engine or when the engine is first started.

BRIEF DESCRIPTION OF THE DRAWINGS

FIG. 1 is a front view of the hydraulic tensioner of the present invention.

FIG. 2 is a sectional view of the tensioner of FIG. 1 taken along line 2—2.

FIG. 3 is a top view of the tensioner of FIG. 1.

FIG. 4 is a sectional view of the hydraulic tensioner of FIG. 3 taken along line 4—4.

FIG. 5 is an exploded perspective view of the hydraulic tensioner of FIG. 1.

FIG. 6 is a portion of the sectional view of FIG. 2 illustrating the details of the pawl rack member and flexible tab.

FIG. 7 is a perspective view of a portion of the pawl member.

FIG. 8 is a perspective view of a portion of the pawl member illustrating the side and rack teeth.

FIG. 9 is a perspective view of an alternative embodiment illustrating two pawls.

FIG. 10 is a side view of another embodiment of the hydraulic tensioner of the present invention.

FIG. 11 is a sectional view of the tensioner in FIG. 10 along line A—A.

DETAILED DESCRIPTION OF THE PREFERRED EMBODIMENTS

Figure 12:
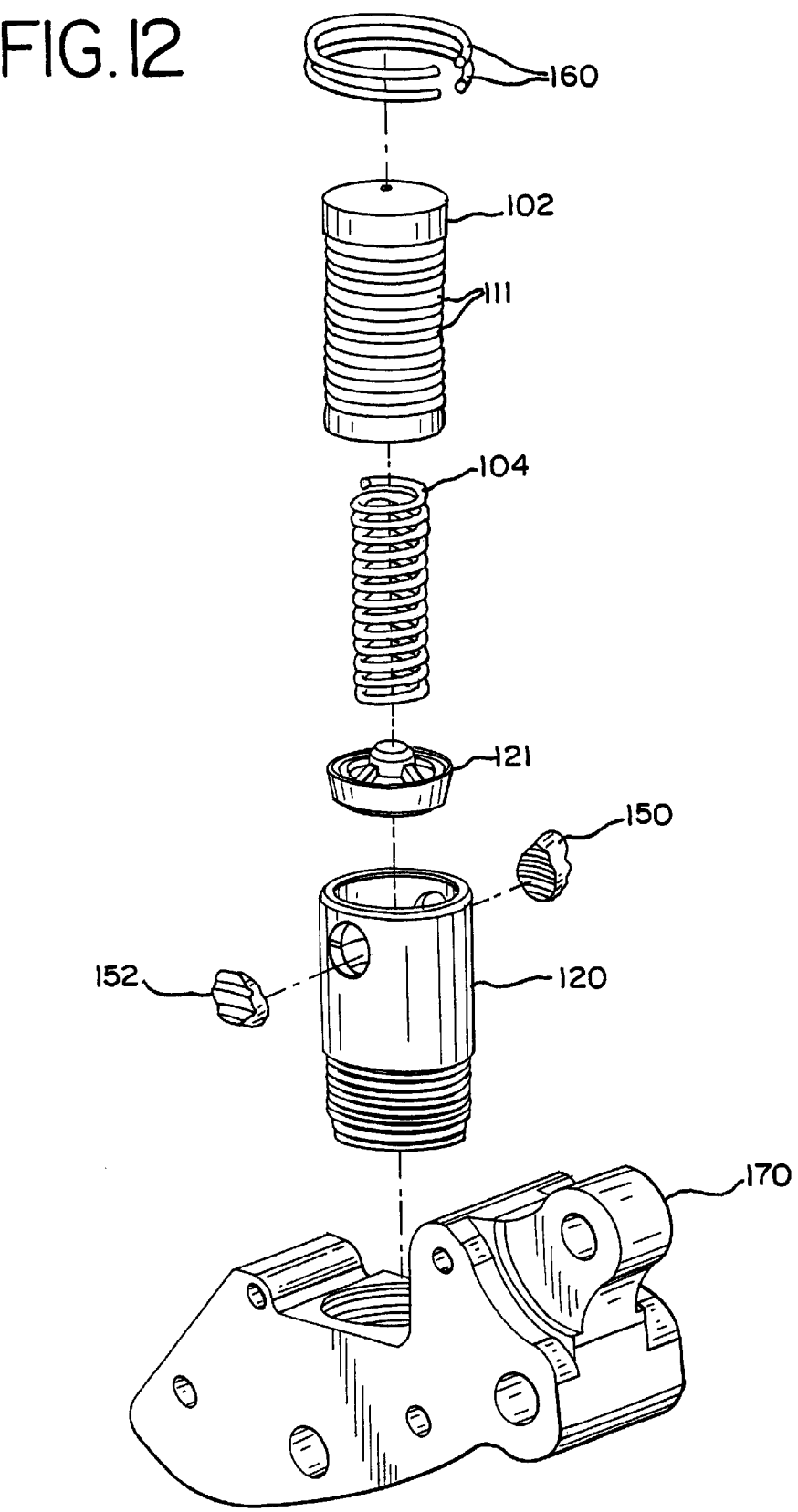
FIG. 12 is an exploded perspective view of the tensioner of FIGS. 10 and 11.

FIG. 1 illustrates the hydraulic tensioner 10 having a housing 20, a retaining pin 5, and a pawl rack member 3 fitted in place in a groove in the bore 15. As shown in FIGS. 2 and 5, a bore 15 within the tensioner housing 20 forms a fluid chamber with the interior of hollow piston 2. The fluid chamber 22 is filled with fluid through a passageway 24 from a pressurized fluid source 25. The fluid source may be an oil pump or a reservoir.

The chamber, preferably cylindrical, receives a hollow piston 2, also preferably cylindrical. The outside of the piston 2 has several grooves 11, or steps, integrally formed on the piston. The grooves 11 form a piston rack that contacts corresponding wedges or grooves 12 on the pawl rack member 3 as the piston moves outward from housing. The pawl rack member 3 includes at least one flexible tab 13, which contacts an upper groove 14 of the piston to hold the piston in place for shipping. A vent disc 8 is placed in the upper end of the inside of the piston, and a piston spring 4 contacts the vent disc 8 and piston to bias the piston 2 in a protruding or outward direction.

During start-up of the hydraulic chain tensioner, after the tensioner has been installed and clip 5 has been removed, the piston is pushed outward by the force of the piston spring on the piston. As a result of the pressure differential formed across the check valve 21, fluid enters through passageways 23 and 24 and flows through the check valve and into the chamber 22 while pushing air to the upper end of the chamber 22. The chamber 22 continues to fill with fluid until the force inward on the piston 2 by the chain (not shown) is balanced by the force of the spring 4 and the resistance force of the fluid in the chamber 22.

The check valve 21 is provided between the chamber 22 and the source of fluid pressure to permit fluid flow into the chamber 22, while blocking fluid flow in the reverse direction. The check valve 21 includes a ball 7, ball retainer 6, and spring 9. The spring 9 biases the ball 7 against the seat formed by the passageway 24.

FIG. 3 shows the top of the tensioner 10, and FIG. 4 shows a sectional view of the tensioner 10 along line 4—4 of FIG. 3. FIG. 5 illustrates the separate parts of the tensioner 10.

The pawl rack member 3 of the present invention is shown in detail in FIGS. 6, 7, and 8. As shown in FIG. 6, one feature of the rack, is the piston retention feature by which the flexible tab 13, which is normally biased radially outward from the piston, is hooked within the uppermost groove 14 of the piston to hold the piston in its innermost position. The piston is securely held in this position by insertion of clip 5 through the aperture 28 in the piston and corresponding aperture 29 in the housing. This feature is used during shipping of the piston. The clip 5 is removed upon installation in the engine.

FIGS. 7 and 8 illustrate the details of the pawl rack member. The base 31 of the pawl member 3 is held in a groove in the housing by a spring steel piece 33. The spring steel member can be secured to the housing by rivets 35, screws, or other attaching mechanisms. Wedges or grooves 12 are formed along the surface of the pawl member in order to contact the corresponding grooves 11 in the piston.

As shown in FIG. 6, a stepped groove 37 is formed so that the rack grooves catch in the stepped groove and stop the piston 2 from leaving the tensioner housing. This provides an upper limit on piston travel.

An alternative embodiment of the pawl rack member is shown in FIG. 9. In that embodiment, two pawls 50 and 52 are shown on opposite sides of the rack member.

FIGS. 10–12 show a preferred embodiment of the dual pawl rack tensioner 110. As shown in FIG. 10, the tensioner 110 includes the tensioner housing 170 which receives a bore 120. A hollow piston 102 is slidably received within the bore 120. In this embodiment, the spring band member is in the form of a pair of circlips 160 which are located on the outside of the bore 120 and retain pawl 152 by engaging slots formed on the outside of the pawl 152. In addition, the circlips 160 normally bias the pawl 152 toward the piston 102.

As shown in FIG. 11, which is a sectional view of the tensioner shown in FIG. 10 along line A—A, fluid is supplied to a fluid chamber formed between the bore 120 and the hollow piston 102 through the passageway 123 in the housing 170 and the passageway 124 from a pressurized fluid source 125. The piston 120 is biased outwardly from the housing and bore by a piston spring 104. Left pawl 150 and right pawl 152 are located opposite one another in slots formed near the top of the bore 120. A pair of circlips 160 are located on the outside of the bore 120 and retain the left and right pawls 150,152 by engaging slots formed on the outside of the pawls 150,152. The left pawl 150 is located a half pitch lower on the bore with respect to the right pawl 152, both pawls having teeth formed on an inside surface which engage grooves or steps 111, (shown in FIG. 12), on the outside of the piston 102.

FIG. 12 shows the hydraulic tensioner of FIGS. 10 and 11 in an exploded perspective view. The tensioner includes a housing 170 having a bore 120 with a pair of pawls 150,152 held in bore slots by circlips 160. The piston 102 has grooves or steps 111 for engagement with the pawls 150,152, the piston being slidably received within the bore and biased outwardly by a piston spring 104. The pawls 150,152 are located in slots or grooves on opposite sides of the bore 120 and are vertically offset with regard to one another by a half pitch. In other words, one of the pawls is located a half pitch closer to the open end of the bore near the tip or distal end of the piston with regard to the other.

The advantage of off setting the pawls is that both the pitch of the grooves or teeth on the outside of the piston and the inside of the pawls can be made larger and the outward motion of the piston can be controlled in smaller increments. For example, in a single pawl design with a 1 mm pitch, the pitch defined as the distance between two adjacent grooves or teeth, the piston must move 1 mm to engage the next tooth of the pawl. In a dual pawl design where the pawls are offset by a half pitch, the piston needs to move only 0.75 mm to engage the next tooth of a pawl where a pitch of 1.5 mm is provided both on the piston and the inside surface of each pawl. A benefit of a larger pitch is ease of manufacturing. In addition, the control of piston movement in smaller increments provides improved control of piston backlash.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner for an automotive engine chain or belt system comprising:
    a housing having a bore;
    a hollow piston slidably received within the bore, said piston forming a fluid chamber with said bore and having a plurality of grooves formed along the outside of the piston;
    at least one pawl rack member positioned radially outward from said piston in a groove in said housing, said at least one pawl rack member having a plurality of stepped wedges constructed and arranged to contact said grooves along the outside of said piston to limit the piston travel in the axial direction,
    a generally semi-circular spring band member disposed around a portion of the housing and operably connected to said at least one pawl rack member, said wedges being normally biased toward said piston by said spring band member to contact said piston grooves;
    a piston spring biasing the piston in an outward direction from said bore; and
    a check valve provided between the chamber and a source of pressurized fluid to permit fluid flow into the chamber while blocking flow in the reverse direction.

2. The hydraulic tensioner of claim 1 wherein said spring band member is a circular spring steel clip within a groove in said housing.

3. The hydraulic tensioner of claim 1 wherein said piston includes a stepped groove for contacting said wedges to provide a position of maximum outward axial travel of said piston.

4. The hydraulic tensioner of claim 1 wherein said piston grooves comprise a plurality of wedges.

5. The hydraulic tensioner of claim 1 wherein axial movement of said rack pawl member is limited by said housing groove.

6. The hydraulic tensioner of claim 1 wherein said rack pawl member includes at least one flexible retention tab for holding said piston at an innermost axial position.

7. The hydraulic tensioner of claim 1 wherein said pawl rack member includes a plurality of pawl members mounted within said groove.

8. The hydraulic tensioner of claim 1, wherein said spring band member holds said pawl rack member in said groove.

9. The hydraulic tensioner of claim 6 wherein said flexible retention tab is normally biased in a direction radially outward from said piston.

10. The hydraulic tensioner of claim 9 wherein said flexible retention tab cooperates with a retention groove at the uppermost portion of said piston to retain said piston in said innermost position.

11. The hydraulic tensioner of claim 9 wherein said flexible tab extends radially inward from said pawl rack member.

12. The hydraulic tensioner of claim 9 wherein said flexible tab extends axially outward from said pawl rack member.

13. A hydraulic tensioner comprising:
    a housing having a bore;
    a hollow piston slidably received within the bore, said piston forming a fluid chamber with said bore and having a plurality of grooves formed along the outside of the piston;
    a pair of pawls mounted in slots formed in said housing, each of said pawls having a plurality of stepped wedges constructed and arranged to contact said plurality of grooves along the outside of said piston;
    at least one circlip surrounding said housing and engaging an outside surface of said pair of pawls, said wedges being normally biased toward said piston by said at least one circlip to contact said piston grooves, thereby to limit piston travel in the axial direction;
    a piston spring biasing the piston in an outward direction from said bore; and
    a check valve provided between the chamber and a source of pressurized fluid to permit fluid flow into the chamber while blocking flow in the reverse direction.

14. The hydraulic tensioner of claim 13, wherein said pair of pawls are located opposite one another in said housing, said outside surface of said pair of pawls being engaged by a plurality of circlips surrounding said housing.

15. The hydraulic tensioner of claim 13, wherein said pair of pawls are offset with regard to each other by a half pitch.

16. The hydraulic tensioner of claim 13, wherein said pair of pawls are located opposite one another in said bore.

17. The hydraulic tensioner of claim 14, wherein said plurality of grooves of said piston and said plurality of stepped wedges of said pair of pawls have a pitch of 1.5 mm.

* * * * *